United States Patent
Baecher et al.

(10) Patent No.: US 9,755,863 B2
(45) Date of Patent: *Sep. 5, 2017

(54) HIGH DATA RATE MULTILEVEL CLOCK RECOVERY SYSTEM

(71) Applicant: International Business Machines Corporation, Armonk, NY (US)

(72) Inventors: Matthew B. Baecher, Rock Tavern, NY (US); Troy J. Beukema, Briarcliff Manor, NY (US); Lamiaa Msalka, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/350,146

(22) Filed: Nov. 14, 2016

(65) Prior Publication Data

US 2017/0170994 A1     Jun. 15, 2017

Related U.S. Application Data

(63) Continuation of application No. 14/963,540, filed on Dec. 9, 2015.

(51) Int. Cl.
 *H04L 25/03* (2006.01)
 *H04L 27/02* (2006.01)
(52) U.S. Cl.
 CPC ........ *H04L 25/03057* (2013.01); *H04L 27/02* (2013.01); *H04Q 2213/03* (2013.01)
(58) Field of Classification Search
 CPC . H04L 27/02; H04L 25/03057; H04L 7/0016; H04L 25/03038; H04L 25/4917; H04Q 2213/03
 See application file for complete search history.

(56) References Cited

U.S. PATENT DOCUMENTS 7,167,516 B1   1/2007 He
8,184,686 B2   5/2012 Wall et al.
(Continued)

FOREIGN PATENT DOCUMENTS

GB    2356324 A    5/2001

OTHER PUBLICATIONS

F.A. Musa et al., "High-Speed Baud-Rate Clock and Data Recovery," 7th International Conference on ASIC (ASICON), Oct. 2007, pp. 64-69.

(Continued)

*Primary Examiner* — Syed Haider
(74) *Attorney, Agent, or Firm* — Kelvan Razavi; Ryan, Mason & Lewis, LLP

(57) ABSTRACT

Digital receiver systems and clock recovery techniques for use in digital receiver systems are provided to implement asynchronous baud-rate clock recovery systems for high data rate serial receivers multilevel line modulation. A two-stage postcursor ISI equalization system is provided to efficiently emulate a 4-level DFE (decision feedback equalization) system, for example, while converting a 4-level equalized signal to s 2-level equalized signal. For example, a two stage postcursor ISI equalization system includes a DFE stage which operates on a most significant component of a given 4-level data symbol, followed by a DFFE (decision-feedforward equalizer) stage which operates on a least significant component of the given 4-level data symbol. In parallel with the DFFE stage, an estimate of the least significant component is subtracted from the equalized 4-level data symbol to convert the 4-level data symbol to a 2-level symbol.

20 Claims, 6 Drawing Sheets

(56) References Cited

U.S. PATENT DOCUMENTS

| | | |
|---|---|---|
| 8,243,866 B2 | 8/2012 | Huang et al. |
| 8,325,793 B2* | 12/2012 | Zhong ............... H04L 25/03019 |
| | | 375/233 |
| 8,654,884 B2 | 2/2014 | Kerr |
| 8,929,496 B2 | 1/2015 | Lee et al. |
| 9,379,920 B1 | 6/2016 | Liao et al. |
| 2004/0234002 A1 | 11/2004 | Yang et al. |
| 2005/0058234 A1* | 3/2005 | Stojanovic ............ H04L 7/0334 |
| | | 375/371 |
| 2006/0164270 A1 | 7/2006 | Miller et al. |
| 2008/0205563 A1* | 8/2008 | Simpson ............ H03H 17/0261 |
| | | 375/350 |
| 2010/0284686 A1 | 11/2010 | Zhong |
| 2015/0195108 A1* | 7/2015 | Prokop ............. H04L 25/03057 |
| | | 375/233 |
| 2015/0349988 A1* | 12/2015 | Annampedu ..... H04L 25/03019 |
| | | 375/231 |

OTHER PUBLICATIONS

List of IBM Patents or Patent Applications Treated as Related.

* cited by examiner

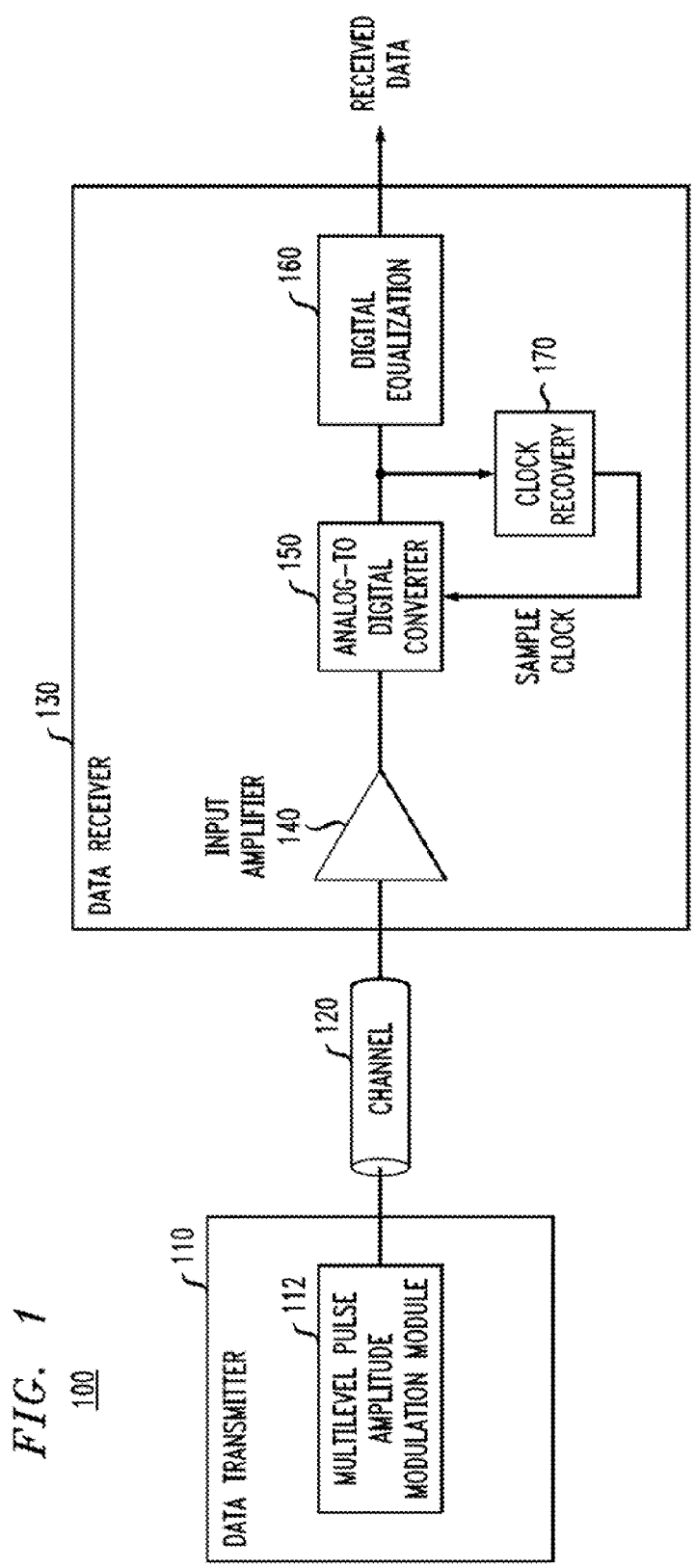

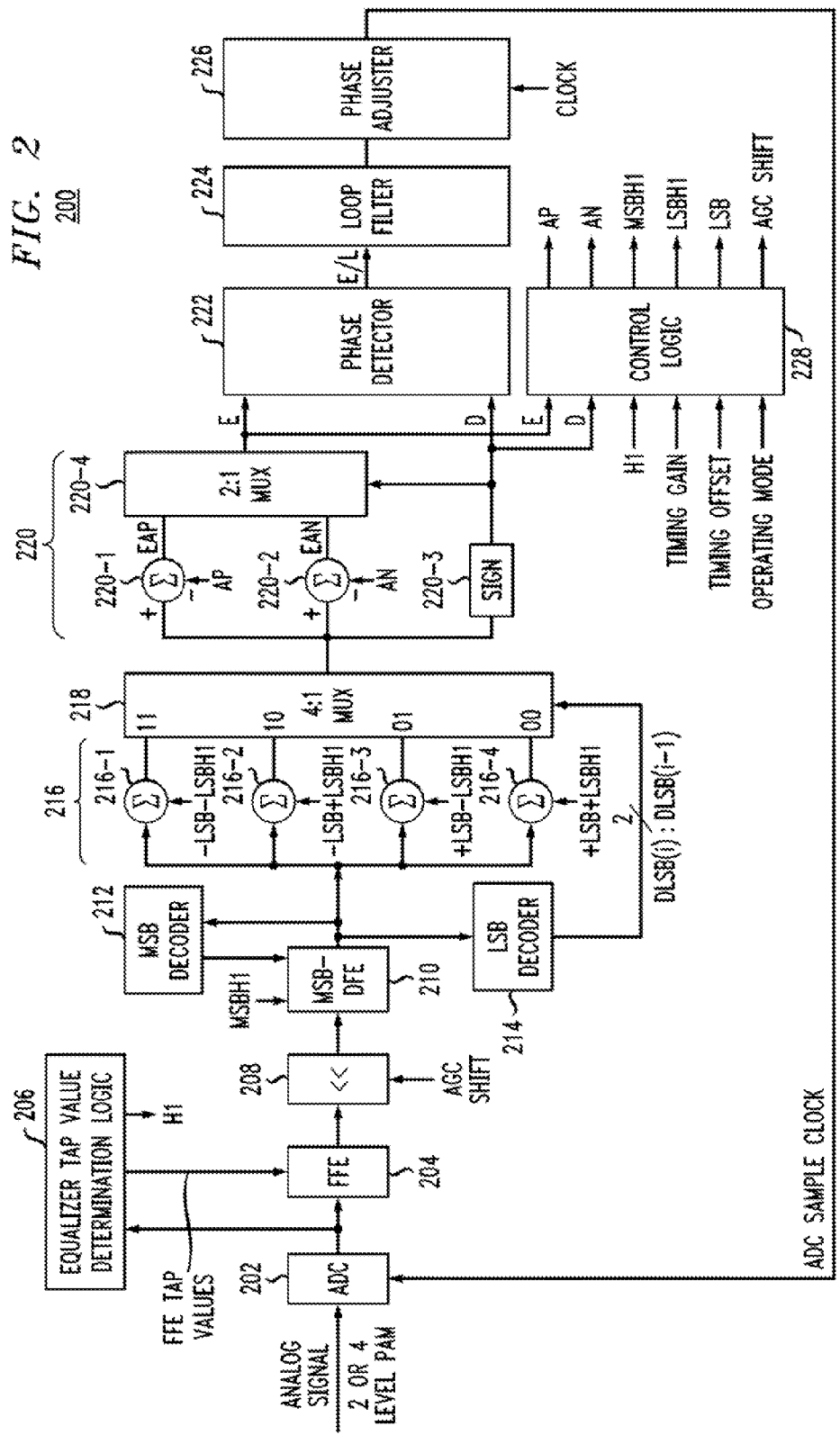

4-LEVEL SIGNAL MSB AND LSB COMPONENTS
AND MSB DECODE/LSB DECODE FUNCTION

HIGH DATA RATE MULTILEVEL CLOCK RECOVERY SYSTEM

TECHNICAL FIELD

This disclosure generally relates to digital receiver systems and, more specifically, to clock recovery techniques for use in digital receiver systems.

BACKGROUND

Current state of the art integrated circuit CMOS (complementary metal oxide semiconductor) technology supports the implementation of digital-based receiver systems for use in high data rate (e.g. 28 Gb/s and higher) wireline communications systems. These wireline communications systems include, for example, backplane transceivers used in data processing systems and networking infrastructure such as interact-protocol (IP) routers and switches. Some advantages of using a digital-based receiver design include, for example, the ability to realize digital functions in low power and low die area using state of the art CMOS processes such as 14 nm CMOS and beyond. Further, digital-based receiver designs can efficiently support line modulation schemes that are more complex than the standard 2-level "Non-Return to Zero" (NRZ) modulation scheme that is currently used in a wide majority of backplane wireline communication transceivers up to data rates of 28 Gb/s. Indeed, evolving industry standards are now migrating to 4-level line modulation to improve the spectral efficiency, or equivalently, to increase the maximum data rate than can be transmitted through a bandlimited wireline channel. By way of example, the current 56 Gb/s industry data rate for medium-reach electrical backplane applications is supported by 4-level PAM (pulse amplitude modulation). A digital receiver design is ideal to realize a 56 Gb/s 4-level PAM data transceiver system because such design can readily implement complex digital functions, such as line equalization and digital clock recovery functions, which are necessary to accurately process and decode 4-level modulated signals.

SUMMARY

Embodiments of the invention include digital receiver systems and clock recovery techniques for use in digital receiver systems. For example, one embodiment includes a clock recovery system. The clock recovery system comprises an ADC (analog-to-digital converter) circuit, a FFE (feed forward equalizer) circuit, a DFE (decision feedback equalizer) circuit, a DFFE (decision feedforward equalizer) circuit, and control circuitry. The ADC circuit is configured to sample an analog signal in response to sample a clock signal and generate a digital signal comprising sequence of digital data samples. The analog signal comprises a stream of data symbols, wherein each data symbol comprises a plurality n of symbol components, including at least a first symbol component and a second symbol component. Each digital data sample corresponds to one data symbol in the analog signal. The FFE circuit is configured to remove precursor ISI (intersymbol interference) from the digital data samples and at least partially remove postcursor ISI from the digital data samples, and output FFE equalized data samples. The DFE circuit is configured to remove a first component of postcursor ISI from the FFE equalized data samples, and output DFE equalized data samples, wherein the first component of postcursor ISI of a given data sample arises from the first symbol component of a previous data sample. The DFFE circuit configured to remove a second component of postcursor ISI from the DFE equalized data samples, and generate DFFE equalized data samples, wherein the second component of postcursor ISI of a given data sample arises from the second symbol component of a previous data sample. The DFFE circuit is further configured to remove all but one of the n symbol components from each DFFE equalized data sample, and output an equalized 2-level digital signal comprising a sequence of equalized 2-level data samples. The control circuitry is configured to process the equalized 2-level digital signal to determine an amount of any residual postcursor and precursor ISI of the equalized 2-level digital signal, and to adjust a phase of the sample clock signal that is applied to the ADC circuitry to minimize the residual postcursor and precursor ISI of the equalized 2-level digital signal.

In one embodiment of the invention, the analog signal comprises 4-level PAM signal, wherein each data symbol comprises a most-significant bit (MSB) as the first symbol component, and a least significant bit (LSB) as the second symbol component, and wherein the equalized 2-level digital signal output from the DFFE circuit comprises only the MSB components of the data samples.

Another embodiment of the invention includes a digital receiver system. The digital receiver system includes an amplifier circuit, an ADC circuit, a digital equalization system, and a clock recovery system. The amplifier circuit is configured to amplify a received analog signal, wherein the analog signal comprises a stream of data symbols, wherein each data symbol comprises a plurality (n) of symbol components, including at least at first symbol component and a second symbol component. The ADC circuit is configured to sample the analog signal in response to a sample clock signal and generate a digital signal comprising sequence of digital data samples, wherein each digital data sample corresponds to one data symbol in the analog signal. The digital equalization system is configured to filter the digital signal to remove intersymbol interference and recover the stream of data symbols. The clock recovery system is configured to process the digital signal and generate the sample clock signal which is applied to the ADC circuit. The clock recovery system includes a FFE circuit, a DFE circuit, a DFFE circuit, and control circuitry. The FFE circuit is configured to remove precursor ISI (intersymbol interference) from the digital data samples and at least partially remove postcursor ISI from the digital data samples, and output FFE equalized data samples. The DFE circuit is configured to remove a first component of postcursor ISI from the FFE equalized data samples, and output DFE equalized data samples, wherein the first component of postcursor ISI of a given data sample arises from the first symbol component of a previous data sample. The DFFE circuit configured to remove a second component of postcursor ISI from the DFE equalized data samples, and generate DFFE equalized data samples, wherein the second component of postcursor ISI of a given data sample arises from the second symbol component of a previous data sample. The DFFE circuit is further configured to remove all but one of the n symbol components from each DFFE equalized data sample, and output an equalized 2-level digital signal comprising a sequence of equalized 2-level data samples. The control circuitry is configured to process the equalized 2-level digital signal to determine an amount of any residual postcursor and precursor ISI of the equalized 2-level digital signal, and to adjust a phase of the sample clock signal that is applied to the ADC circuitry to minimize the residual postcursor and precursor ISI of the equalized 2-level digital signal.

Another embodiment of the invention includes a clock recovery method, which comprises: receiving an analog signal, wherein the analog signal comprises a stream of data symbols, wherein each data symbol comprises a plurality (n) of symbol components, including at least a first symbol component and a second symbol component; converting the analog signal into a digital signal by sampling the analog signal using a sample clock signal to generate a sequence of digital data samples, wherein each digital data sample corresponds to one data symbol in the analog signal; equalizing the digital signal using a FFE (feed forward equalization) function to remove precursor ISI (intersymbol interference) from the digital data samples and at least partially remove postcursor ISI from the digital data samples, and generate FFE equalized data samples; equalizing the FFE equalized data samples using a DFE (decision feedback equalization) function to remove a first component of postcursor ISI from the FFE equalized data samples, and generate DFE equalized data samples, wherein the first component of postcursor ISI of a given data sample arises from the first symbol component of a previous data sample; equalizing the DFE equalized data samples using a DFFE (decision feedforward equalization) function to remove a second component of postcursor ISI from the DFE equalized data samples, and generate DFFE equalized data samples, wherein the second component of postcursor ISI of a given data sample arises from the second symbol component of a previous data sample; removing all but one of the n symbol components from each DFFE equalized data sample to generate an equalized 2-level digital signal comprising a sequence of equalized 2-level data samples; and processing the equalized 2-level digital signal to determine an amount of any residual postcursor and precursor ISI of the equalized 2-level digital signal, and to adjust a phase of the sample clock signal to minimize the residual postcursor and precursor ISI of the equalized 2-level digital signal.

Other embodiments of the invention will be described in following detailed description of embodiments, which is to be read in conjunction with the accompanying drawings.

BRIEF DESCRIPTION OF THE DRAWINGS

FIG. 1 is a block diagram of a system which comprises a clock recovery system according to an embodiment of the invention.

FIG. 2 is a high-level block diagram of a multilevel clock recovery system according to an embodiment of the invention.

DETAILED DESCRIPTION

Figure 3A:
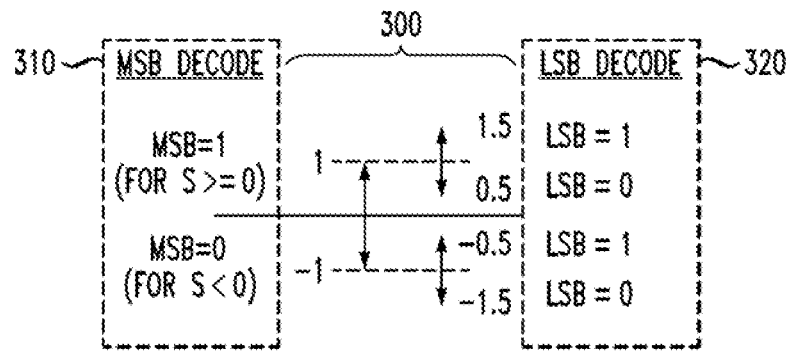
FIG. 3A schematically illustrates a 4-level PAM scheme, as well as decode functions of decode circuitry in the multilevel clock recovery system of FIG. 1, according to an embodiment of the invention.

Embodiments of the invention will now be discussed in further detail with regard to digital receiver systems and clock recovery techniques for use in digital receiver systems. As discussed in further detail below, embodiments described herein include asynchronous baud-rate clock recovery systems and methods for high data rate serial receivers, in particular, digital receivers with multilevel line modulation. Techniques are provide to implement digital baud-rate clock recovery systems in modem (nominal 14 nm) CMOS technology to support industry-evolving 56 Gb/s per lane data rates using 4-level line modulation (e.g., 4-level PAM) while maintaining backward compatibility with 2-level NRZ systems.

FIG. 1 is a block diagram of a system which comprises a clock recovery system according to an embodiment of the invention. In particular, FIG. 1 illustrates a system 100 comprising a data transmitter 110, a communications channel 120, and a data receiver 130. The data transmitter 110 comprises a multilevel pulse amplitude modulation (PAM) module 112. The data receiver 130 comprises an input amplifier 140, an analog-to-digital converter (ADC) 150, a digital equalization system 160, and a clock recovery system 170. Embodiments of the clock recovery system 170 will be discussed in further detail below with reference to FIGS. 2, 3A/3B, 4, 5, and 6, for example. The system 100 may be implemented in various applications in which digital data streams are transmitted between compute systems or components. For example, the system 100 may be implemented on a multi-chip module to enable chip-to-chip communication, wherein the data transmitter 110 is located on one chip, and the data receiver 130 is located on another chip, and the communications channel 120 comprises a microstrip transmission line formed on a package carrier, for example.

The data transmitter 110 transmits a high data rate bit stream to the data receiver 130 over the communications channel 120. Specifically, in one embodiment of the invention, the multilevel PAM modulation module 112 is configured to modulate a serial data stream to be transmitted over the communications channel 120 using n-level PAM, which results in the generation of a symbol stream where each symbol has one of n discrete amplitudes (of some power of two). For example, in 4-level PAM there are $2^2$ possible discrete pulse amplitudes, in 8-level PAM there are $2^3$ possible discrete pulse amplitudes, and in 16-level PAM there are $2^4$ possible discrete pulse amplitudes, etc. For purposes of illustration, embodiments of the invention will be discussed in the context of 2-level and 4-level PAM signals, although the techniques discussed herein can be extended to multilevel PAM where n is greater than 4.

Figure 3B:
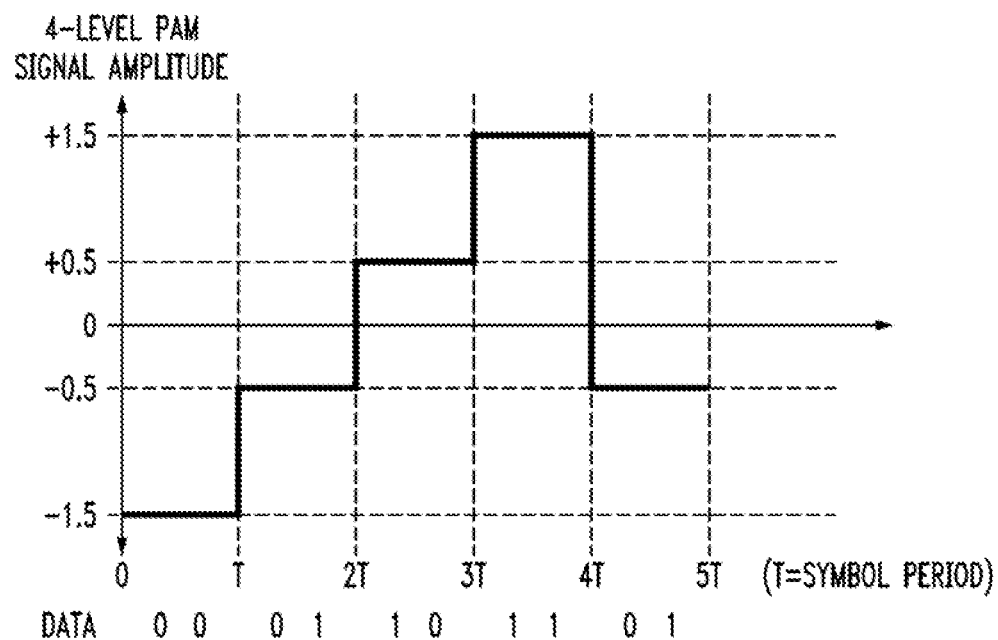
FIG. 3B is an example illustration of a 4-level PAM signal which can be decoded using a multilevel clock recovery system according to an embodiment of the invention.

For example, FIG. 3A schematically illustrates a 4-level PAM scheme 300 which can be implemented by the multilevel PAM module 112, and FIG. 3B illustrates an example 4-level PAM signal which can be generated by the multilevel PAM modulation module 112 a 4-level PAM scheme 300 based on a given data stream shown in FIG. 3B. In particular, with a 4-level PAM scheme, each of two successive data bits in a given data bit stream are converted to a single data symbol. With the 4-level PAM scheme 300 shown in FIGS. 3A and 3B, each data symbol is represented by one of 4 discrete voltage amplitudes, e.g., −1.5, −0.5, +0.5, +1.5, depending on the values of the two bits that are represented by the data symbol. Specifically, each data symbol represents two bits, comprising a MSB (most significant bit) and a LSB (least significant bit).

In the exemplary 4-level PAM scheme 300 shown in FIG. 3A, the MSB of a given symbol is accorded either a nominal value of +1 when the MSB is logic "1" or a nominal value of −1 when the MSB is logic "0". Moreover, the LSB of a given symbol is accorded either a nominal value of +0.5 when the LSB is logic "1" or a nominal value of −0.5 when the LSB is logic "0". The discrete PAM value of a given symbol is determined by adding the nominal values of the MSB and LSB. For example, based on the scheme shown in FIG. 3A, a data symbol represented by two data bits 00 will have a pulse amplitude of −1.5 (i.e., −1+−0.5), and a data symbol represented by two data bits 01 will have a pulse amplitude of −0.5 (i.e., −1+0.5). Further, a data symbol represented by two data bits 10 will have a pulse amplitude of +0.5 (i.e., +1+−0.5), and a data symbol represented by two data bits 11 will have a pulse amplitude of +1.5 (i.e., +1+0.5).

FIG. 3B illustrates an example 4-level PAM signal that is generated based on the above PAM scheme 300 for a data stream of 0001101101 over 5 symbol periods. In a first symbol period T, a PAM signal value of −1.5 represents the first two successive data bits 00. In a second symbol period 2T, a PAM signal value of −0.5 represents the next two successive data bits 01. In a third symbol period 3T, a PAM signal value of +0.5 represents the next two successive data bits 10. In a fourth symbol period 4T, a PAM signal value of +1.5 represents the next two successive data bits 11. In a fifth symbol period 5T, a PAM signal value of −0.5 represents the next two successive data bits 01. With 4 level PAM scheme, a data stream received at 56 Gb/s is actually transmitted over the communications channel 120 at a corresponding BAUD rate of 28 Gb/s because each transmitted symbol represent two data bits.

The data receiver 130 receives a 4-level PAM signal that is transmitted over the communications channel 120. Because of the band-limiting characteristics of the communications channel 120 (and/or other transmission characteristics), the transmitted PAM symbol stream can be distorted (e.g., spreading of the symbol pulses) causing intersymbol interference (ISI). The ISI is removed using techniques discussed below. The received analog signal is amplified by the input amplifier 140. The amplified analog signal (which is output from the amplifier 140) is converted to a digital format by the ADC 150. The ADC 150 uses a sampling clock signal that is generated and output from the clock recovery system 170 to sample the received analog signal. The digital signal output from the ADC 150 is processed by the digital equalization system 160 and the clock recovery system 170 to generate estimates of data received from the data transmitter 110.

In particular, the digital equalization system 160 is configured to filter the received data stream using a digital filter (e.g., FIR (finite impulse response) filter), which removes the ISI from the received symbol stream using known techniques. As is known in the art, an equalization process essentially inverts an impulse response of the channel and generates an equalized impulse response having zero ISI and channel distortion. Equalization methods are known in the art, the details of which are not needed for one of ordinary skill in the art to understand embodiments of the invention described herein.

The clock recovery system 170 is configured to extract a phase-accurate sample clock signal from the received data stream, wherein the sample clock signal is used to clock the ADC 150 so that the ADC samples are taken at an optimum sample time to optimize data decode. For example, a single ADC sample is taken per each received 4-level symbol to minimize power draw of the system. For maximum implementation efficiency, clock recovery techniques discussed herein are configured to recover the ADC sample clock signal from the same digitized samples that are used to recover the data. A system which recovers timing information from the same digitized samples used to recover data is referred to in this disclosure as a "baud-rate timing recovery system." Such a system is desired since it minimizes the sampling rate needed by the ADC to the minimum possible sample rate required to recover the data, and hence reduces system power and complexity.

One technique that is used for clock recovery in baud-rate sampled systems is known as the Mueller-Muller based approach. The premise behind this approach is to determine a data sample timing point where the ISI arising from a previous transmitted symbol (generating postcursor ISI at the data sample point) and a next transmitted symbol (generating precursor ISI at the data sample point) are balanced. In a practical realization of the Mueller-Muller approach, precursor symbol ISI and a portion of postcursor symbol ISI are first removed by a feedforward equalizer (FFE). Next, a decision-feedback equalizer (DFE) is used to remove the remaining postcursor symbol ISI. Following removal of the ISI terms from the previous and next symbol, sign-error terms EAP (sign error at mean positive signal value AP) and EAN (sign error at mean negative signal value AN) at the data sample point are determined, which are utilized to determine a relative strength of any residual postcursor and precursor ISI following the FFE and DFE equalization. These sign error terms EAP and EAN along with an estimate of the data bit are sent to a phase-detector The phase detector determines an early-late timing adjust signal which is sent to a loop filter, wherein the loop filter is implemented, for example, as a proportional-integral (PI) filter. The loop filter in turn drives a phase adjustment system, commonly realized as a phase rotator, to adjust the sampling phase of the ADC sample clock to a point where the precursor and postcursor ISI at the data sample time are both balanced to zero (or to small residual values) after ISI equalization by the FFE and DFE. This method of clock recovery is well known in the art and is most commonly employed in digital receiver systems since a digital receiver is most power efficient when it only needs to take one ADC sample per received symbol.

As data rates have evolved to 56 Gb/s in modern wireline communication standards, the line signaling has changed from 2 levels per symbol to 4 levels per symbol, which complicates a practical hardware implementation of a baud-rate clock recovery system. For example, a 4-level DFE function is difficult to realize because there is too much delay involved in computing decision-feedback terms from the 4-level signal, so the DFE timing loop is difficult to close in modern CMOS logic realizations. This problem can be solved by adding complex pipelining to the DFE design, but this increases processing latency and power consumption. Processing latency in particular is not desired since it has the effect of destabilizing the clock recovery loop which increases jitter on the recovered clock and, in turn, can significantly degrade receiver bit-error-rate (BER).

Furthermore, the use of 4-level PAM signaling makes a straightforward implementation of a baud-rate phase detector more complex, since a +/−1 BAUD ISI correlation must be performed against 4 data levels and 3 ISI threshold combinations instead of two data levels and one ISI threshold combination as in a NRZ system. In this regard, embodiments of the invention as discussed herein include systems and methods to address these issues, and provide for a practical realization of a power and area efficient, low-latency baud-rate clock recovery system for use in, e.g., state of the art 56 Gb/s digital 4-level wireline data receiver systems, while maintaining support for 2-level operation in 28 Gb/s and lower NRZ systems.

FIG. 2 is a block diagram of a high data rate multilevel clock recovery system according to an embodiment of the invention. More specifically, FIG. 2 is a block diagram of an asynchronous baud-rate clock recovery system 200 according to an embodiment of the invention, which can be implemented in either a 2-level or a 4-level high data rate receiver system to achieve low processing latency and low implementation complexity. In one embodiment of the invention, the clock recovery system 200 is an extension of the Mueller-Muller based approach discussed above, wherein a novel DFE function (which is used to remove ISI prior to a Mueller-Muller phase detector) is realized using a two-stage postcursor ISI equalization system comprising a DFE stage which operates on a most significant components (e.g., MSB) of a given 4-level PAM data symbol, followed by a DFFE (decision-feedforward equalizer) stage which operates on a least significant component (e.g., LSB) of the given 4-level PAM data symbol. As explained in further detail blow, practical hardware implementations of a two-stage postcursor ISI equalization system according to embodiments of the invention allow for closing of the DFE feedback timing loop in high data rate applications (e.g., 56 Gb/s).

In addition, in parallel with the DFFE stage, an estimate of the least significant component (e.g., LSB) of the given 4-level PAM data symbol is subtracted from an equalized 4-level PAM data symbol to convert the 4-level PAM data symbol to a 2-level symbol which is subsequently processed with an efficient 2-level Mueller-Muller phase detector. In this regard, as explained in further detail below the clock recovery system 200 of FIG. 2 avoids the complexity issues associated with having to implement a phase detection function in hardware to correlate +−0 BAUD ISI against 4 levels, as opposed to two levels. For example, in one embodiment of the invention, this complexity is avoided by implementing a speculative multiplexing scheme that is configured to simultaneously subtract a current LSB component from an equalized 4 level symbol at the same time that the DFFE stage removes the postcursor ISI of the equalized 4-level symbol, which arises from a previous received LSB estimate.

Referring to FIG. 2, the digital baud-rate clock recovery system 200 comprises ADC circuitry 202, FFE circuitry 204, equalizer tap value determination logic 206, shift logic circuitry 208, MSB-DFE circuitry 210, MSB decode circuitry 212, LSB decode circuitry 214, LSB-DFFE summer circuitry 216, multiplexer circuitry 218, sign error detection circuitry 220, phase error detection circuitry 222, loop filter circuitry 224, phase adjustment circuitry 226, and control logic 228. In one embodiment of the invention, the equalizer tap value determination logic 206 and control logic 228 comprises state machines (e.g., implemented in firmware), and the functions of the ADC circuitry 202, the FFE circuitry 204, the shift logic circuitry 208, the MSB-DFE circuitry 210, the MSB decode circuitry 212, the LSB decode circuitry 214, the LSB-DFFE summer circuitry 216, the multiplexer circuitry 218, the sign error detection circuitry 220, the phase error detection circuitry 222, the loop filter circuitry 224, and the phase adjustment circuitry 226, are implemented in hardware.

In operation, the ADC circuitry 202 receives as input an analog signal (e.g., a 4-level PAM signal) and samples the analog signal via an ADC sample clock to generate a digital signal comprising a sequence of digital samples. The digital signal is input to the FFE circuitry 204 and to the equalizer tap value determination logic 206. The equalizer tap value determination logic 206 is configured to determine equalization coefficient values ("FFE tap values") which are output to the FFE circuitry 204. The FFE circuitry 204 is configured to utilize the FFE tap values (e.g., postcursor, precursor taps) to cancel precursor ISI of the digital sample and to partially cancel postcursor ISI of the digital samples. Details of the FFE circuitry 204 according to an embodiment of the invention will be discussed in further detail below with reference to FIG. 6.

The equalizer tap value determination logic 206 is further configured to determine a 1-tap postcursor DFE tap value ("H1"). The value H1 is input to the control logic 228 to generate a coefficient MSBH1 which is input to the MSB-DFE circuitry 210. The equalizer tap value determination logic 206 is configured as a state machine that implements any of a variety of methods commonly known in the art to generate and/or dynamically update the equalization coefficient values (e.g., FFE tap values and H1) for the FFE/DFE equalization functions, wherein the values are determined to minimize or eliminate the ISI contribution from previous and next data samples at a given data sampling point following the FFE/DFE equalization.

In one embodiment, the partially equalized digital samples that are output from the FFE circuitry 204 are input to the shift logic circuitry 208. The shift logic circuitry 208 is configured to scale a level of the digital samples in response to a control signal AGC SHIFT that is generated and output from the control logic 228, wherein the scaling serves to avoid digital underflow or overflow in remaining processing blocks.

Following the AGC shift, the partially equalized digital samples are input to the MSB-DFE circuitry 210 which is configured to at least partially remove remaining postcursor ISI from the digital samples, which arises from the MSB components of previous data samples. The MSB-DFE circuitry 210 performs MSB equalization using postcursor MSBH1 tap values that are generated and output from the control logic 228. In addition, the MSB-DFE circuitry 210 operates in conjunction with the MSB decode circuitry 212, wherein the MSB decode circuitry 212 is configured to determine the sign (+ or −) of MSB components of the digital samples, wherein the MSB sign information is utilized by the MSB-DFE circuitry to perform the postcursor MSB ISI equalization.

The output of the MSB-DFE circuitry 210 is input to the LSB decode circuitry 214 and to the LSB-DFFE summer circuitry 216. The LSB-DFFE summer circuitry 216 comprises a first summer circuit 216-1, a second summer circuit 216-2, a third summer circuit 216-3, and a fourth summer circuit 216-4. The first summer circuit 216-1 adds the values −LSB and −LSBH1 to a digital sample output from the MSB-DFE circuitry 210. The second summer circuit 216-2 adds the values and −LSB and +LSBH1 to the digital sample output from the MSB-DFE circuitry 210. The third summer circuit 216-3 adds the values +LSB and −LSBH1 to the digital sample output from the MSB-DFE circuitry 210. The fourth summer circuit 216-4 adds the values +LSB and +LSBH1 to the digital sample output from the MSB-DFE circuitry 210. The values LSB and LSBH1 are generated and output from the control logic 228.

The LSB-DFFE summer circuitry 216 is configured to perform DFFE equalization of the partially equalized digital samples (which are output from the MSB-DFE circuitry 210) by removing postcursor ISI from the digital samples, which arises from the LSB components of previous samples. The MSB-DFFE summer circuitry 216 performs LSB equalization by adding (or subtracting) a postcursor LSBH1 tap value from the partially equalized digital samples received from the MSB-DFE circuitry 210. In addition, the MSB-DFFE summer circuitry 216 either adds or subtracts an LSB value from the equalized digital samples received from the MSB-DFE circuitry 210 to essentially remove the LSB component from the digitals samples. The MSB-DFFE summer circuitry 216 operates in conjunction with the LSB decode circuitry 214, wherein the LSB decode circuitry 214 is configured to determine the sign (+ or −) of LSB components of the digital samples. The LSB sign information is utilized by the 4:1 multiplexer circuitry 218 to select one of the summed outputs of the summer circuits 216-1, 216-2, 216-3 and 216-4.

Figure 6:
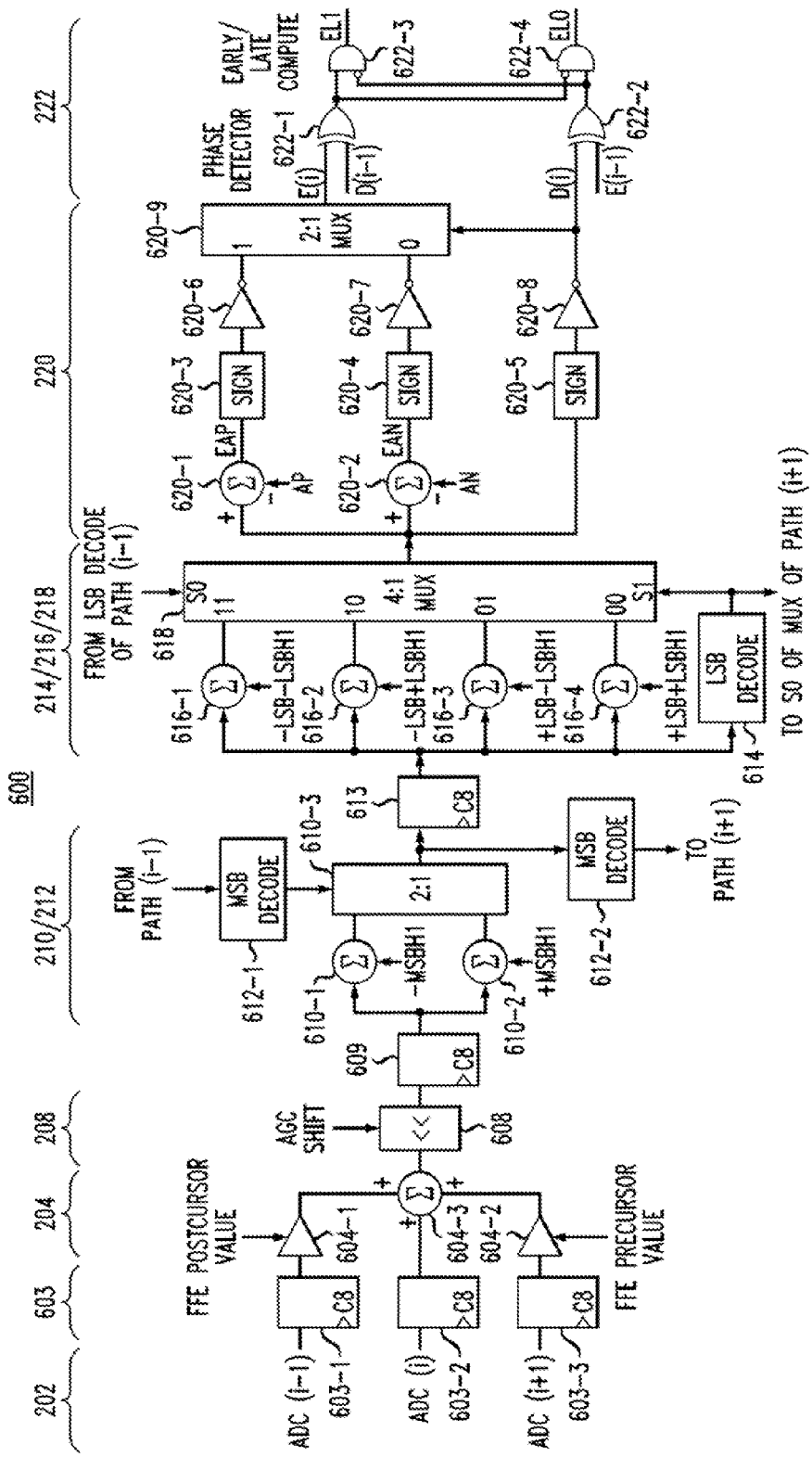
FIG. 6 is a block diagram of a hardware realization of a multilevel clock recovery system according to an embodiment of the invention, which is based on a parallel implementation of the high-level clock recovery system of FIG. 2.

More specifically, in the embodiment shown in FIG. 6, the 4:1 multiplexer circuitry 218 is responsive to a select control signal [DLSB(i):DLSB(i−−1)] which is output from the LSB decode circuitry 214. The control signal DLSB(i) represents a decoded LSB of a current data sample (i), which will have a bit value of logic "1" or logic "0" depending on the whether the decoded LSB value of the current data sample (i) is positive or negative. Similarly, the control signal DLSB(i−1) represents a decoded LSB of a previous data sample (i−1), which will have a bit value of logic "1" or logic "0" depending on the whether the decoded LSB value of the previous data sample (i−1) is positive or negative.

The LSB sign information [DLSB(i):DLSB(i−1)] is input to select control inputs of the 4:1 multiplexer circuitry 218 to select one of the summed outputs of the summer circuits 216-1, 216-2, 216-3 and 216-4. The selected outputs of the 4:1 multiplexer circuitry 218 comprise 2-level equalized data samples which include only the MSB components (with LSB components removed) and which have no or minimal postcursor MSB ISI and LSB ISI.

In one embodiment of the invention, the MSB-DFE circuitry 210 the MSB decode circuitry 212, the LSB decode circuitry 214, the LSB-DFFE summer circuitry 216, and the 4:1 multiplexer circuitry 218 collectively implement a two-stage postcursor ISI equalization system which is configured to efficiently emulate a 4-level DFE system, while converting the 4-level equalized signals to 2-level equalized signals. More specifically, the MSB-DFE circuitry 210 and the MSB decode circuitry 212 collectively implement a DFE stage of a two-stage postcursor ISI equalization system, wherein the DFE stage operates on a most significant component (e.g., MSB) of a given 4-level PAM data symbol to thereby remove postcursor ISI from the digital samples, which arises from the MSB components of previous samples.

In addition, the LSB decode circuitry 214, the LSB-DFFE summer circuitry 216, and the 4:1 multiplexer circuitry 218 collectively implement a DFFE stage of a two-stage postcursor ISI equalization system, wherein the DFFE stage operates on a least significant component (e.g., LSB) of the given 4-level PAM data symbol to thereby remove postcursor ISI from the digital samples, which arises from the LSB components of previous samples. In addition, DFFE stage is configured to convert a 4-level signal into a nominal 2-level signal by subtracting the LSB component from a current 4 level symbol at the same time that the DFFE stage is subtracting the postcursor LSB ISI from the current 4-level symbol, which arises from the LSB component of a previous symbol.

The two-level output from the multiplexer circuitry 218 is then processed by the sign error detection circuitry 220 to determine ISI error at the data sample point. In particular, the sign error detection circuitry 220 comprises a first summer circuit 220-1, a second summer circuit 220-2, sign determination circuitry 220-3, and 2:1 multiplexer circuitry 220-4. The first summer circuit 220-1 adds a value AP to the output of the 4:1 multiplexer circuitry 218, while the second summer circuit 220-2 adds a value AN to the output of the 4:1 multiplexer circuitry 218. The values of AP and AN are generated and output from the control logic 228.

The sign determination circuitry 220-3 is configured to determine the sign of the output signal of the 4:1 multiplexer circuitry 218, and outputs a signal D which represents a determined sign of the current data sample (e.g., D is either a logic "1" or logic "0" depending on whether the sign is positive or negative). The signal D is utilized as a select control signal to the 2:1 multiplexer circuitry 220-4 to select one of the outputs of the first and second summer circuits 220-1 and 220-2, based on the determined sign. The output of the 2:1 multiplexer circuitry 220-4 represents an error signal E.

The outputs E and D of the 2:1 multiplexer circuitry 220-4 and the sign determination circuitry 220-3, respectively, are input to the phase error detection circuitry 222. The phase error detection circuitry 222 is configured to determine an early/late (E/L) phase correction signal to drive the loop filter circuitry 224. The output of the loop filter circuitry 224 is input to the phase adjustment circuitry 226 which closes the clock recovery loop to drive the ADC sample clock for the ADC circuitry 202.

As shown in FIG. 2, the control logic 228 receives various signals E, D and H1, which are generated by components of the clock recovery system 200, as well as other control signals such as TIMING GAIN, TIMING OFFSET and OPERATING MODE, which are generated by other control logic of the host system (e.g., digital receiver system). The control logic 228 generates and outputs various signals including AP, AN, MSBH1, LSBH1, LSB, and AGC SHIFT, which are utilized by various components of the clock recovery system 200, as discussed herein. Details of the how the control logic 228 utilizes the various input control signals and generates the various output control signals will be discussed in further detail below.

FIG. 3A schematically illustrates a 4-level PAM scheme 300 (as discussed above) as well as decode functions 310 and 320 of the MSB decode circuitry 212 and the LSB decode circuitry 214, respectively, according to an embodiment of the invention. In particular, as discussed above, FIG. 3A illustrates a 4-level PAM scheme 300 in which a first component (e.g., MSB data value) of a given data symbol modulates a sign of a normalized +/−1 level symbol, while a second component (e.g., LSB data value) of the given data symbol modulates the sign of a normalized +/−0.5 level symbol. The sum of these two components creates the desired 4-level data symbol which encodes two components (e.g., MSB and LSB) of information.

As further shown in FIG. 3A, the decode function 310 of the MSB decode circuitry 212 is configured to determine a value of a digital sample output from the MSB-DFE circuitry 210 and output a logic "1" if the value of the digital sample (s) is ≥0, and output a logic "0" otherwise. Moreover, the decode function 320 of the LSB decode circuitry 214 is configured to determine the normalized value of the data sample output from the MSB-DFE circuitry 210 and output one of the following binary values as a function of the normalized value of the data sample, as further shown on the following table:

TABLE 1

| Normalized Signal Value Output From MSB-DFE Circuit | Output of LSB Decode Circuit |
|---|---|
| ≥1 | 1 |
| ≥0, <1 | 0 |
| >−1, <0 | 1 |
| ≤−1 | 0 |

Figure 4:
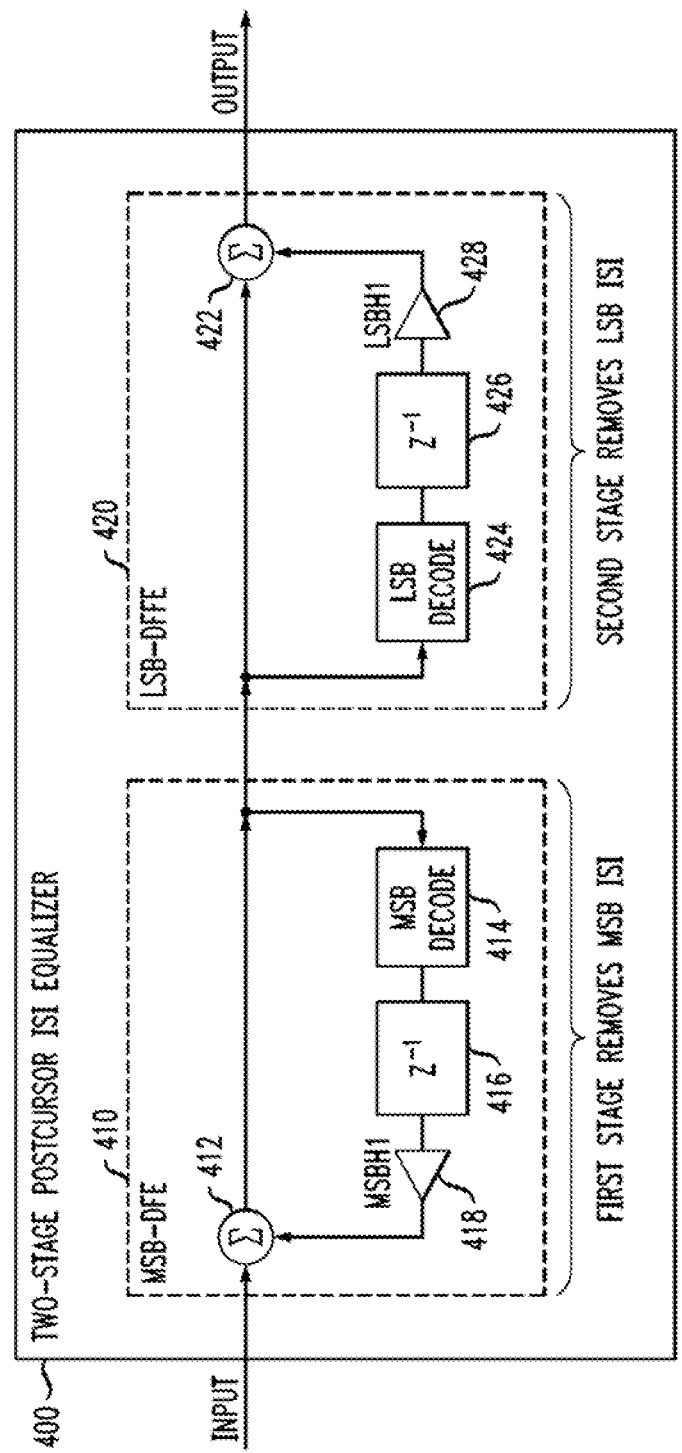
FIG. 4 is a high-level conceptual illustration of a two-stage postcursor ISI equalizer system according to an embodiment of the invention.

FIG. 4 is a high-level conceptual illustration of a two-stage postcursor ISI equalizer system 400 according to an embodiment of the invention, which can be implemented in the clock recovery system 200 of FIG. 2. The two-stage postcursor ISI equalizer system 400 comprises a MSB-DFE stage 410 and a LSB-DFFE stage 420. The MSB-DFE stage 410 comprises summer circuitry 412, MSB decode circuitry 414, delay circuitry 416, and multiplication circuitry 418. The LSB-DFFE stage 420 comprises summer circuitry 422, LSB decode circuitry 424, delay circuitry 426, and multiplication circuitry 428.

The MSB-DFE stage 410 is configured to remove postcursor ISI of a given data sample which arises from the MSB component of a previous data sample. In the feedback path of the MSB-DFE stage 410, the MSB decode circuitry 414 determines the sign of the feedback term based solely on the sign of the output sample at the output of the summer circuitry 412. This avoids the need for implementing a time consuming digital threshold comparison, since the sign of the output sample may be determined directly by the MSB of the output sample of the MSB-DFE stage 410. For example, as noted above with reference to FIG. 3A, the MSB decode function 310 outputs a logic "1" if the digital sample is ≥0, and outputs a logic "0" otherwise. The delay circuitry 416 is configured to provide a one sample delay in the feedback path. The multiplication circuitry 418 is configured to apply a MSBH1 equalization tap value to the output sample in the feedback path, and the equalized output sample in the feedback path is added to a next sample via the summer circuitry 412.

The LSB-DFFE stage 420 is configured to remove postcursor ISI of the given data sample which arises from the LSB component of the previous data sample. In particular, at the output of the MSB-DFE stage 410, there still remains undesired postcursor ISI on the equalized data sample, which arises from the LSB component of the previous data sample. This LSB ISI is removed by the LSB-DFFE stage 420 using a decision-feedforward equalization. In a feedforward path, the LSB decode circuitry 424 estimates the sign of the LSB at the output of the MSB-DFE stage 410 using the LSB decode function 320 as discussed above with reference to FIG. 3A, and as illustrated in TABLE 1 above. The delay circuitry 426 is configured to provide a one sample delay in the feedforward path. The multiplication circuitry 428 is configured to apply an equalization tap value LSBH1 (which comprises a fraction of H1, for example) to the output sample in the feedforward path, and the equalized output sample in the feedforward path is added to a next sample via the summer circuitry 422.

Figure 5:
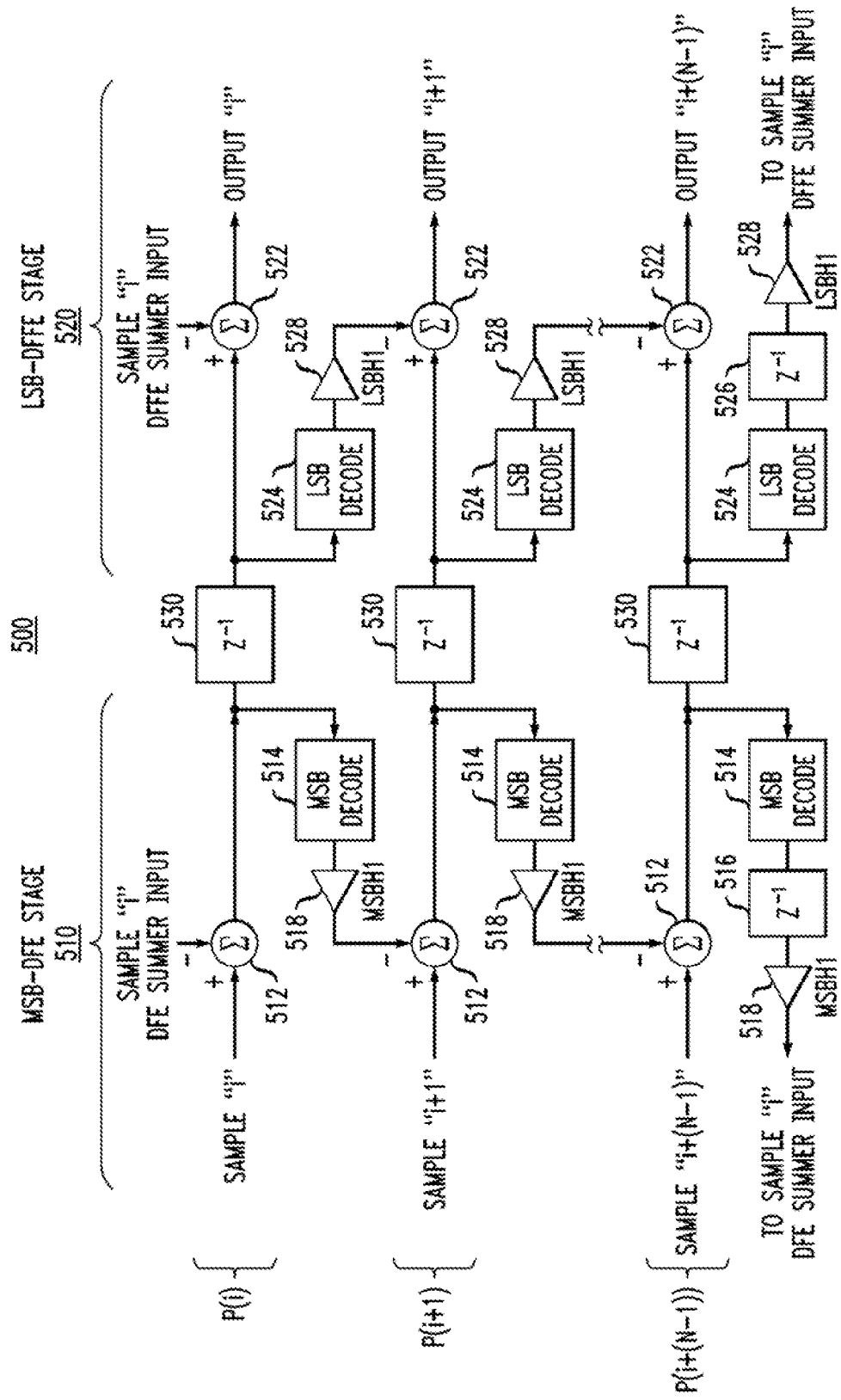
FIG. 5 is a block diagram of a parallel implementation of the two-stage postcursor ISI equalizer system of FIG. 4, according to an embodiment of the invention.

FIG. 5 is a block diagram of a parallel implementation of the two-stage postcursor ISI equalizer system of FIG. 4, according to an embodiment of the invention. More specifically, FIG. 5 schematically illustrates a two-stage postcursor ISI equalizer system 500 comprising a MSB-DFE stage 510 and an LSB-DFFE stage 520. The two-stage postcursor ISI equalizer system 500 comprises a parallel configuration in which blocks of N successive samples (i), (i+1), . . . , (i+(N−1)), are clocked in parallel into N parallel inputs to the MSB-DFE stage 510, and processed in N parallel processing paths P(i), P(i−1), . . . , P(i+(N−1)) of the two-stage postcursor ISI equalizer system 500. In one embodiment of the invention, N=8.

In the parallel embodiment shown in FIG. 5, each processing path P(i), P(i−1), . . . , P(i+(N−1)) of the MSB-DFE stage 510 comprises a summer circuit 512, and a feedback path having MSB decode circuitry 514 and multiplication circuitry 518, which have similar functions as the decode circuitry 414 and multiplication circuitry 418 discussed above with reference to FIG. 4, for example. The feedback path of a given processing path of the MSB-DFE stage 510 is coupled between the output of the summer circuitry 512 in the given processing path and the input of the summer circuitry 512 in a next processing path. For example, as shown in FIG. 5, the output of the summer circuit 512 in the processing path P(i) is equalized in the feedback path and input to the summer circuitry 512 in the next processing path P(i+1), wherein the equalized sample of the previous sample (i) is added with the current sample (+1).

As further shown in FIG. 5, the output of the summer circuit 512 in the processing path P(i+(N−1)) is equalized in the feedback path of the processing path P(i+(N−1)) and input to the summer circuitry 512 in the next processing path P(i), wherein the equalized sample of the previous sample P(i+(N−1)) is added to the current sample (i). The feedback path of the processing path P(i+(N−1)) comprises a delay circuit 516 to provide at least one sample delay to provide time to clock in the next block of N successive data samples, wherein the new sample (i) of the next block of N successive data samples would be the next successive sample of the sample (i+(N−1)) of the current block of N successive data samples.

Each processing path P(i), P(i−1, . . . , P(i+(N−1)) comprises a delay circuit 530 to couple the corresponding processing paths of the MSB-DEE stage 510 and the LSB-DFFE stage 520. The delay circuits 530 are configured to provide at least one sample delay. In the parallel embodiment shown in FIG. 5, each processing path P(i), P(i−1), . . . , P(i+(N−1)) of the MSB-DFFE stage 520 comprises a summer circuit 522, and a feedforward path having LSB decode circuitry 524 and multiplication circuitry 528, which have similar functions as the decode circuitry 424 and multiplication circuitry 428 discussed above with reference to FIG. 4, for example.

The feedforward path of a given processing path of the LSB-DFFE stage 520 is coupled between the corresponding processing path output of the MSB-DFE stage 510 and the input of the summer circuitry 522 in a next processing path of the LSB-DFFE stage 520. For example, as shown in FIG. 5, the feedforward path of the processing path P(i) of the LSB-DFFE stage 520 is coupled between the corresponding processing path P(i) output of the MSB-DEE stage 510 and the input of the summer circuitry 522 in a next processing path P(i+1) of the LSB-DFFE stage 520. In each feedforward path of the LSB-DFFE stage 520, a previous sample (e.g., MSB equalized sample (i)) is equalized and input to the summer circuit 522 of the next processing path, wherein it is added to the current sample (e.g., MSB equalized sample (i+1)).

As, further shown in FIG. 5, the output of the feedforward path of the processing path P(i+(N−1)) of the LSB-DFFE stage 520 is coupled to an input of the summer circuit 522 in the processing path P(i) of the LSB-DFFE stage 520, wherein a previous equalized data sample output from the feedforward path of the processing path P(i+(N−1)) is added to the current sample (e.g., MSB equalized sample (i)) in the processing path P(i). The feedforward path of the path P(i+(N−1)) of the LSB-DFFE stage 520 comprises a delay circuit 526 to provide at least one sample delay to provide time to clock in the next block of N successive data samples, as discussed above.

In the parallel embodiment shown in FIG. 5, the MSB-DFE output (i+(N−1)) will not be known until the MSB decode and DFE summer operations ripple through all previous N−1 parallel processing paths. As such, it is desirable to minimize the time that it takes to perform the MSB decode and DFE summation operations to enable an efficient logic realization that meets timing requirements. At the very least, the parallel implementation in FIG. 5 slows down the clock rate of the parallel processing paths of the MSB-DFE stage 510 to a range of <4 GHz. The slower clock rate of the parallel processing paths enables an efficient logic realization of the MSB-DFE stage 510 to meet timing requirements in modern CMOS technology digital logic (e.g., to close the MSB-DFE feedback timing loop). By way of example, for a 56 Gb/s 4-level PAM digital receiver, wherein the PAM symbols are transmitted at a rate of 28 G symbols per second, assuming that the number N of parallel processing paths is 8, then the clock rate (C8 clock rate) in each of the parallel paths is 28/8=3.5 G samples per second. A practical hardware implementation of a parallel MSB-DFE stage 510 according to an embodiment of the invention will be discussed below with reference to FIG. 6.

The use of a two-stage postcursor ISI equalization system of FIG. 5, for example, is advantageous for various reasons as discussed herein. For example, because the LSB-DFFE stage 520 utilizes feedforward ISI cancellation instead of feedback cancellation, there is no length-N feedback ripple loop to settle. As such, the extra time that is needed to perform the LSB decode functions by the LSB decode circuitry 524 with required digital level comparisons (equivalent to adds/subtracts) can be readily accommodated in a practical hardware realization in modern CMOS technology at "C8" clock data rates (i.e. in a range of less than 4 GHz logic clock).

It is to be noted that because the data samples at the path outputs of the MSB-DFE stage 510 may still contain undesired postcursor ISI arising from the uncorrected LSB ISI, the combination of this uncorrected ISI with other uncompensated ISI terms and noise may increase the probability of incorrectly determining the LSB value for a received signal. However, in a practical embodiment, the LSB determination errors can be tolerated in the clock recovery system because of a large amount of filtering that is performed by the loop filter circuitry 224 (FIG. 2). In particular, in one embodiment of the invention, the loop filter 224 is implemented as a proportional-integral filter, wherein the proportional and integral gain is configured to achieve a control loop bandwidth in the range of about BAUD/2000 or lower, where BAUD is the line symbol transmission rate in symbols/s. As a result, thousands of samples are averaged within the loop bandwidth of the clock recovery control system. This large amount of averaging increases the tolerance of the clock recovery system to intermittent MSB and LSB decision errors arising from channel noise, crosstalk, and uncompensated ISI.

FIG. 6 is a block diagram of a hardware realization of a multilevel clock recovery system 600 according to an embodiment of the invention, which is based on a parallel implementation of the high-level clock recovery system of FIG. 2. For ease of illustration, FIG. 6 schematically depicts the circuitry along one processing path P(i) of a N parallel processing paths of the multilevel clock recovery system 600 (e.g., N=8). The circuitry shown in FIG. 6 comprises a portion of each of the ADC circuitry 202, the FFE circuitry 204, the shift logic circuitry 208, the MSB-DFE circuitry 210, the MSB decode circuitry 212, the LSB decode circuitry 214, the LSB-DFFE summer circuitry 216, the 4:1 multiplexer circuitry 218, the sign error detection circuitry 220, and the phase error detection circuitry 222 of FIG. 2. While FIG. 6 shows one processing path of N parallel processing paths of the clock recovery system 600, it is to be understood that each of the N processing paths is implemented using the hardware configuration as shown in FIG. 6.

In this regard, it is to be understood that in the example embodiment of FIG. 6, the index (i) denotes the index for a current sample (i) on a given processing path P(i), wherein the processing path P(i) shown in FIG. 6 represents any one of the N parallel processing paths (e.g., processing paths P(i), P(i−1), . . . , P(i+(N−1)), as shown in FIG. 5). The index (i−1) denotes a previous data sample or previous processing path (relative to the index (i)), and the index (i+1) denotes a next data sample or a next processing path (relative to the index (i)).

Referring to FIG. 6, in one embodiment of the invention, each processing path P(i) receives as input three ADC samples, including, a current sample ADC(i), a previous sample ADC(i−1) and a next sample ADC(i+1). The ADC samples ADC(i−1), ADC(i) and ADC(i+1) are temporarily held in corresponding latches 603. In particular, the latches 603 comprise a first latch 603-1 to store the previous sample ADC(i−1), a second latch 603-2 to store a current sample ADC(i), and a third latch 603-3 to store a next digitized sample ADC(i+1). The latches 603 are controlled by a clock signal C8 which is a fraction (e.g., ⅛) of the frequency of the ADC sampling clock.

FIG. 6 illustrates a practical hardware implementation the FFE circuitry 204 in the given processing path. In one embodiment, the FEE circuitry 204 comprises an n-tap FFE circuit (e.g., n=3) comprising a first multiplier 604-1, a second multiplier 604-2, and a summer circuit 604-3. The first multiplier 604-1 is configured to multiply a value of the previous sample ADC(i−1), which is output from the latch 603-1, by a FEE postcursor value. The second multiplier 604-2 is configured to multiply a value of the next digitized sample ADC(i+1), which is output from the latch 603-3, by a FFE precursor value. The summer circuit 604-3 is configured to add a value of the current sample ADC(i) to the corrected values of the previous sample ADC(i−1) and the next sample ADC(i+1) output from the respective multipliers 604-1 and 604-2. The output of the summer circuit 604-3 is a FFE equalized version of the current digitized sample ADC(i).

In the embodiment of FIG. 6, the FFE circuitry 204 comprises a minimum 3 taps, one tap to cancel precursor ISI of the current sample ADC(i) and one tap to partially cancel postcursor ISI of the current sample ADC(i). In other embodiments, an n-tap FFE can be implemented with n>3. In a preferred practical embodiment, a 3 tap FFE is implemented to minimize processing latency and hardware complexity of the FFE circuitry 204. As noted above, the FFE postcursor and precursor tap values are generated by the equalizer tap value determination logic 206 (FIG. 2).

The clock recovery system 600 further comprises, in the given processing path, a shift logic circuit 608, which is part of the shift logic circuitry 208 of the clock recovery system of FIG. 2, and a latch 609 connected to the output of the shift-left logic circuit 608. The latch 609 is controlled by the same clock signal C8 which controls the latches 603.

The embodiment of FIG. 6 further illustrates a practical hardware implementation of the MSB-DFE circuitry 210 (FIG. 2) using speculative DFE feedback. The use of direct summer circuits (e.g., the summer circuits 512 of the MSB-DFE stage 510 shown in FIG. 5) may not be practical due to excess logic delay for the summation function, which could prevent the clock recovery system from meeting logic timing constraints. To address this issue, an efficient DFE summation function according to one embodiment of the invention is realized using speculative computation of both possible DFE feedback states, one of which being selected using a multiplexer based on control signals output from the MSB decode circuitry 212.

In particular, the MSB-DFE circuitry 210 in the given processing path shown in FIG. 6 comprises a first summer circuit 610-1, a second summer circuit 610-2, and a 2:1 multiplexer circuit 610-3. The MSB decode circuitry 212 in the given processing path shown in FIG. 6 comprises MSB decode circuits 612-1 and 612-2. As noted above, the MSB-DFE and MSB decode circuitry 210/210 collectively provides a DFE stage of a two stage postcursor ISI equalization system according to an embodiment of the invention. The first summer circuit 610-1 adds a value −MSBH1 to an equalized digital sample that is output from the latch 609, and the second summer circuit 610-2 adds a value +MSBH1 to the equalized digital sample that is output from latch 609. The 2:1 multiplexer circuit 610-3 selectively outputs an MSB equalized output from one of the summer circuits 610-1 and 610-2 in response to a control signal output from the MSB decode circuit 612-1 (which is actually part of a previous processing path P(i−1)).

The MSB equalized output from the 2:1 multiplexer circuit 610-3 is input to the MSB decode circuit 612-2 of the given processing path P(i). In response, the MSB decode circuit 612-2 outputs a control signal to a 2:1 multiplexer circuit of an MSB-DFE circuitry in the next processing path P(i+1). The MSB decode circuits 612-1 and 612-2 are similar in function to the MSB decode circuits 514 in different processing paths, as shown in FIG. 5. The hardware implementation of the MSB-DFE circuitry 210 shown in FIG. 6 greatly speeds up the settling of the MSB-DFE feedback loops since the use of the speculative 2:1 multiplexer circuit 610-3 is significantly faster than implementing an add/subtract operation in hardware.

The output of the 2:1 multiplexer circuit 610-3 is also stored in a latch 613, which is controlled by the same clock signal C8 as the previous latches 603 and 609. The output of the latch 613 is input to the DFFE stage 214/216/218 which, in the given processing path, includes an LSB decode circuit 614, LSB-DFFE summer circuitry comprising a first summer circuit 616-1, a second summer circuit 616-2, a third summer circuit 616-3, and a fourth summer circuit 616-4, and a 4:1 multiplexer circuit 618.

The first summer circuit 616-1 adds the values −LSB and −LSBH1 to an MSB-DFE equalized digital sample output from the latch 613. The second summer circuit 616-2 adds the values −LSB and +LSBH1 to the MSB-DFE equalized digital sample output from the latch 613. The third summer circuit 616-3 adds the values +LSB and −LSBH1 to the MSB-DFE equalized digital sample output from the latch 613. The fourth summer circuit 616-4 adds the values +LSB and +LSBH1 to the MSB-DFE equalized digital sample output from the latch 613. The values LSB and LSBH1 are precomputed by the control logic 228 (FIG. 2). The 4:1 multiplexer 618 selectively outputs the MSB-DFE equalized digital sample (output from the MSB-DFE circuitry 201/212) summed to one of the pre-computed combinations of the LSB and LSBH1 values, based on the values of the select control signals S0 and S1.

In particular, in one embodiment of the invention, the 4:1 multiplexer 618 is controlled by two select signals S0 and S1, wherein S1 is a most significant multiplexer select signal driving the 4:1 multiplexer 618, and S0 is a least significant multiplexer select signal driving the 4:1 multiplexer 618. The select control signal S1 is driven by the output of the LSB decode circuit 614 for the current symbol of the current processing path (i), whereas the select control signal S0 is driven by an output of a LSB decode circuit of a previous symbol of the previous processing path (i−1). As further shown in FIG. 6, the output of the LSB decode circuit 614 drives a select control signal S0 input of a 4:1 multiplexer circuit in a next processing path (i+1) for the next symbol (i+1).

In the embodiment of FIG. 6, the LSB decode circuit 614 receives the MSB-DFE equalized data sample that is output from the latch 613 in the current processing path P(i) and determines a sign of the LSB component of the equalized data sample. The LSB decode circuit 614 outputs a logic "0" (for negative sign) or logic "1" (for positive sign) depending on the determined sign of the LSB component (e.g., see TABLE 1). The output of the LSB decode circuit 614 serves as an S1 control signal for the 4:1 multiplexer circuit 618 in the given processing path P(i), as well as an S0 control signal for the 4:1 multiplexer circuit in a next processing path (i+1) for the next data sample (i+1). Furthermore, an LSB decode circuit in the previous processing path P(i−1) determines a sign of the LSB component of the previous data sample (i−1) and outputs a logic "0" (for negative sign) or logic "1" (for positive sign) as an S0 control signal for the multiplexer circuit 618 in the current processing path P(i).

As discussed above with reference to FIG. 2, the implementation of the 4:1 multiplexer 618 serves to simultaneously remove both the postcursor LSB ISI and the LSB component from the current data sample (i). In particular, when the control signals S0/S1 are 1/1, the sum value at the output of the first summer 616-1 is selected by the 4:1 multiplexer 618. This is because a S0/S1 control signal of 1/1 indicates that the sign of the LSB component of the previous data sample (i−1) is positive, and that the sign of the LSB component of the current data sample (i) is positive. As such, the values −LSB and −LSBH1 are added to the current data sample (i) to remove the remove both the postcursor LSB ISI and the LSB component from the current data sample (i).

Further, when the control signals S0/S1 are 1/0, the sum value at the output of the second summer 616-2 is selected by the 4:1 multiplexer 618. This is because a S0/S1 control signal of 1/0 indicates that the sign of the LSB component of the previous data sample (i−1) is positive, and that the sign of the LSB component of the current data sample (i) is negative. As such, the values −LSB and +LSBH1 are added to the current data sample (i) to remove the remove both the postcursor LSB ISI and the LSB component from the current data sample (i).

In addition, when the control signals S0/S1 are 0/1, the sum value at the output of the third summer 616-3 is selected by the 4:1 multiplexer 618. This is because a S0/S1 control signal of 0/1 indicates that the sign of the LSB component of the previous data sample (i−1) is negative, and that the sign of the LSB component of the current data sample (i) is positive. As such, the values +LSB and −LSBH1 are added to the current data sample (i) to remove the remove both the postcursor LSB ISI and the LSB component from the current data sample (i).

Moreover, when the control signals S0/S1 are 0/0, the sum value at the output of the fourth summer 616-4 is selected by the 4:1 multiplexer 618. This is because a S0/S1 control signal of 0/0 indicates that the sign of the LSB component of the previous data sample (i−1) is negative, and that the sign of the LSB component of the current data sample (i) is negative. As such, the values +LSB and +LSBH1 are added to the current data sample (i) to remove the remove both the postcursor LSB ISI and the LSB component from the current data sample (i).

In this manner, the output of the 4:1 multiplexer circuit 618 comprises an equalized 2-level signal which contains only the MSB component of the current data sample (i), which is either a +1 or −1 normalized NRZ value. As noted above, it is desirable to process a 2 level signal (output from the multiplexer circuit 618) using a baud-rate phase detector, as compared to processing a 4-level signal using a baud-rate phase detector,. This is because processing of a 4-level signal would require correlating four different data levels against ISI arising at three threshold levels at the data sample time (as compared to two data/one ISI threshold levels in a NRZ system), which would greatly increase the logic complexity of the system over a NRZ baud-rate phase detector. Thus, the techniques described herein avoid this complexity by subtracting the LSB component from the 4-level signal to produce an output that includes the MSB component of the signal. This allows use of an efficient 2-level NRZ baud-rate phase detector to determine early/late timing information, as explained in further detail below.

The sign error detection circuitry 220 in the given processing path P(i) comprises a first summer circuit 620-1, a second summer circuit 620-2, sign determination circuits 620-3, 620-4, 620-5, inverters 620-6, 620-7, 620-8, and a 2:1 multiplexer circuit 620-9. The equalized 2-level signal (which is output from the 4:1 multiplexer circuit 618) is input to the first and second summer circuits 620-1 and 620-2, and the sign determination circuit 620-5. The first summer circuit 620-1 subtracts a mean positive value AP from the value of the equalized 2-level signal and outputs an error term EAP. The second summer circuit 620-2 subtracts a mean negative value AN from the value of the equalized 2-level signal and outputs an error term EAN. The error term EAP represents a sign error at the mean positive signal value AP, and the error term EAN represents the sign error at the mean negative signal value AN.

The sign determination circuit 620-3 determines a sign of the EAP term, the sign determination circuit determines a sign of the EAN term, and the sign determination circuit 620-5 determines a sign of the equalized 2-level signal output from the 4:1 multiplexer 618. In one embodiment of the invention, the inverter circuits 620-6, 620-7, and 620-8 are implemented to invert the outputs of the respective sign determination circuits 620-3, 620-4, and 620-5, so that if a given sign is determined to be positive (which is a logic "0" most-significant bit value in twos -complement representation), a logic "1" value at the output of the inverter circuits 620-6, 620-7. and 620-8 will represent a positive sign, whereas a logic "0" value at the output of the inverter circuits 620-6, 620-7, and 620-8 will represent a negative sign.

If the sign of the equalized 2-level signal is determined by the sign determination circuit 620-5 to be positive, a D(i) value of 1 is output from the inverter circuit 620-8. On the other hand, if the sign of the equalized 2-level signal is determined by the sign determination circuit 620-5 to be negative, a D(i) value of 0 is output from the inverter circuit 620-8. The D(i) value is utilized as a select control signal that is input to the 2:1 multiplexer circuit 620-9 to select either the sign bit of EAP or the sign bit of EAN as an error signal output E(i). For example, if the D(i) value is logic "1" (indicating that the sign of the equalized 2-level signal is positive), then the sign bit of EAP is selectively output by the 2:1 multiplexer circuit 620-9 as the error signal E(i). On the other hand, if the D(i) value is logic "0" (indicating that the sign of the equalized 2-level signal is negative), then the sign bit of EAN is selectively output by the 2:1 multiplexer circuit 620-9 as the error signal E(i).

The phase detector circuit 222 in the given processing path P(i) comprises a first XOR (exclusive OR) gate 622-1, a second XOR gate 622-2, a first AND gate 622-3, and a second AND gate 622-4. The first and second XOR gates 622-1 and 622-2 are configured as a phase detector, and the first and second AND gates are configured to generate a complementary Early/Late control signal (EL1/EL0), which are well known circuit configurations for implementing a phase detector circuit. As shown in FIG. 6, the first XOR gate 622-1 receives as input an error signal E(i) for the current data sample (i) and a value D(i−1) of the equalized 2-level signal of the previous processing path P(i−1). The second XOR gate 622-2 receives as input an error signal E(i−1) for the previous data sample (i−1) and the value D(i) of the current sample (i) (equalized 2-level signal) of the current processing path P(i).

The D(i) and E(i) bit sequences that are generated in the current processing path P(i) are processed in combination with the D(i−1) and E(i−1) bit sequences that are generated in the previous processing path P(i−1) to produce a digital Early/Late output signal (EL1, EL0) which drives the digital loop filter 224, as discussed above.

The combination of the bit sequences D(i) and E(i) is performed in a manner to balance the ISI correlation of precursor and postcursor ISI. The bit value D(i−1) imparts postcursor ISI on the current value D(i) so the correlation of data with postcursor ISI is computed by D(i−1) XOR E(i). The value D(i) imparts precursor ISI on value D(i−1) so precursor ISI is computed by D(i) XOR E(i−1). The following truth tables show how an Early/Late timing signal is derived to drive a loop filter.

TABLE 2

Phase detection from D(i) and E(i) Sequences

| D(i) | E(i − 1) | ISI | D(i) XOR E(i − 1) | Timing Sign |
|---|---|---|---|---|
| 0 | 0 | Precursor ISI+ | 0 | Early |
| 0 | 1 | Precursor ISI− | 1 | Late |
| 1 | 0 | Precursor ISI− | 1 | Late |
| 1 | 1 | Precursor ISI+ | 0 | Early |

| D(i − 1) | E(i) | ISI | D(i − 1) XOR E(i) | Timing Sign |
|---|---|---|---|---|
| 0 | 0 | Postcursor ISI+ | 0 | Late |
| 0 | 1 | Postcursor ISI− | 1 | Early |
| 1 | 0 | Postcursor ISI− | 1 | Early |
| 1 | 1 | Postcursor ISI+ | 0 | Late |

TABLE 3

Early/Late Determination from Phase Detector

| D(i) XOR E(i − 1) | D(i − 1) XOR E(i) | EL(i) = D(i) XOR E(i − 1) − D(i − 1) XOR E(i) |
|---|---|---|
| 0 (Early) | 0 (Late) | 0 (Ontime) |
| 0 (Early) | 1 (Early) | −1 (Early) |
| 1 (Late) | 0 (Late) | 1 (Late) |
| 1 (Late) | 1 (Early) | 0 (Ontime) |

The Early/Late digital inputs to the loop filter 224 can be encoded in any desired manner depending on the hardware implementation. For example, in the block diagram in FIG. 6, the following "one hot" early/late encoding may be implemented as follows:

TABLE 4

Early/Late Encoding

| D(i) XOR E(i − 1) | D(i − 1) XOR E(i) | EL1(i) | EL0(i) |
|---|---|---|---|
| 0 (Early) | 0 (Late) | 0 | 0 |
| 0 (Early) | 1 (Early) | 1 | 0 |
| 1 (Late) | 0 (Late) | 0 | 1 |
| 1 (Late) | 1 (Early) | 0 | 0 |

As noted above, the mean AP and AN values are computed by the control logic 228 using the sign error E generated by the sign error determination circuitry 220 and the estimated data value D. In one embodiment of the invention, the control logic 228 utilizes first-order integration loops to compute the AP and AN values based on the E and D values. In particular, if the estimated data value D is positive, control logic 228 integrates the mean AP value toward a larger value if the error term EAP indicates a positive sign (meaning the received signal is greater than AP), and integrates the mean AP value to a smaller value otherwise. If the estimated D value is negative, the mean value AN is updated in a corresponding manner. Once the first-order integration loops converge, the AP and AN values will represent the mean positive and negative values of the samples at the input to the sign error determination circuitry 220.

To avoid overflow or underflow in the signal processing paths, the control logic 228 will examines the values of AP and AN, and if they are too small, the control logic 228 will configure the AGC Shift function 228 on the output of the FFE 204 to shift-left the values in the digital register a desired amount (effectively making the values larger in the fixed precision available in an implementation). The values AP and AN may also become too large if the mean signal level output from the FFE circuitry 204 is later increased for any reason after an AGC shift has been applied. In this instance, the control logic 228 will reduce the amount of shift-left, which is being applied to the FFE output samples, down to a minimum value of 0.

In addition, in one embodiment of the invention, the control logic 228 utilizes the inputs H1, TIMING GAIN, and TIMING OFFSET signals to compute the output values MSBH1, LSB, LSBH1. The value H1 is the normalized DFE postcursor ISI equalization value "H1" that is output from the equalizer tap value determination logic 206. The TIMING GAIN factor is a control signal that is input to the control logic 228, which in a preferred embodiment is typically set to a constant value of 0.85, but may be varied by an external process control if desired over a typical range from 0.7 to 0.9 to adjust a timing lock point on the received signal. The TIMING OFFSET factor is a control signal that is input to the control logic 228, which is set to a nominal constant value of 0, but may also be varied by an external control process if desired to further adjust the timing lock point on the received signal. In a typical application, the TIMING GAIN is left at a nominal operation value of 0.85, while the TIMING OFFSET value may be increased from 0 to adjust the timing point earlier in time (toward a larger H1 ISI in the received signal) and decreased from 0 to adjust the timing point later in time (toward a smaller H1 ISI in the received signal). This adjustment may be desired if it is determined (via an external control process) that the system operating BER can be improved by advancing or retarding the timing lock phase of the clock recovery system.

In one embodiment of the invention, when the digital receiver is configured by the control input OPERATING MODE to function in 4-level mode, the output values MSBH1, LSB, LSBH1 are computed as follows:

$$MSBH1 = (H1 + \text{Timing Offset}) * (AP + AN) * 0.5 * \text{Timing Gain}$$

$$LSB = (AP + AN) * 0.5/2$$

$$LSBH1 = H1 * LSB$$

When the control signal OPERATING MODE input to the control logic 228 specifies a 2-level operating mode, the control logic 228 computes the MSBH1 value the using the same formula above, but sets both the LSB and LSBH1 outputs to a value of 0.

Although embodiments have been described herein with reference to the accompanying drawings for purposes of illustration, it is to he understood that the present invention is not limited to those precise embodiments, and that various other changes and modifications may be affected herein by one skilled in the art without departing from the scope of the invention.

We claim:

1. A clock recovery system, comprising:
   an ADC (analog-to-digital converter) circuit configured to sample an analog signal in response to a sample clock signal and generate a digital signal comprising a sequence of digital data samples, wherein the analog signal comprises a stream of data symbols, wherein each data symbol comprises a plurality of symbol components, including at least a first symbol component and a second symbol component, and wherein each digital data sample corresponds to one data symbol in the analog signal;
   a FFE (feed forward equalizer) circuit configured to remove precursor ISI (intersymbol interference) from the digital data samples and output FFE equalized data samples; and
   a multi-stage postcursor ISI equalizer circuit configured to remove postcursor ISI from the FFE equalized data samples, the multi-stage postcursor ISI equalizer circuit comprising:
     a first stage comprising a DFE (decision feedback equalizer) circuit configured to receive a current FFE equalized data sample, and remove a first component of postcursor ISI from the current FFE equalized data sample based on a DFE tap value H1 to generate a current DFE equalized data sample, wherein the first component of postcursor ISI which is removed from the current FFE equalized data sample comprises postcursor ISI which arises from a first symbol component of a previous digital data sample; and a second stage comprising a DFFE (decision feedforward equalizer) circuit configured to receive the current DFE equalized data sample, and remove a second component of postcursor ISI from the current FFE equalized data sample based on the same DFE tap value H1 to generate a current DFFE equalized data sample, wherein the second component of postcursor ISI which is removed from the current FFE equalized data sample comprises postcursor ISI which arises from a second symbol component of the previous digital data sample.

2. The clock recovery system of claim 1, wherein the DFFE circuit is further configured to remove all but one of the plurality of symbol components from each DFFE equalized data sample, and output an equalized 2-level digital signal comprising a sequence of equalized 2-level data samples.

3. The clock recovery system of claim 2, wherein the analog signal comprises a 4-level PAM (pulse amplitude modulation) signal, wherein each data symbol comprises a most-significant bit (MSB) as the first symbol component, and a least significant bit (LSB) as the second symbol component, and wherein the equalized 2-level digital signal output from the DFFE circuit comprises only the MSB components of the digital data samples.

4. The clock recovery system of claim 2, further comprising control circuitry configured to process the equalized 2-level digital signal to determine an amount of residual postcursor and precursor ISI of the equalized 2-level digital signal, and to adjust a phase of the sample clock signal that is applied to the ADC circuit to minimize the residual postcursor and precursor ISI of the equalized 2-level digital signal.

5. The clock recovery system of claim 4, wherein the control circuitry comprises:
a sign error detection circuit configured to determine sign error values for the equalized 2-level data samples and sign values of the equalized 2-level data samples;
a phase detector circuit configured to process the sign error values and the sign values of the equalized 2-level data samples to determine early-late phase corrections signals;
a loop filter circuit configured to process the early-late phase correction signals and generate phase adjustment control signals; and
a phase adjustment circuit which receives the phase adjustment control signals from the loop filter circuit, and which is configured to adjust the phase of the sample clock signal that is applied to the ADC circuit to minimize the residual postcursor and precursor ISI of the equalized 2-level digital signal.

6. The clock recovery system of claim 1, wherein the DFE circuit comprises:
a first summer circuit configured to add a postcursor correction value to the current FFE equalized data sample;
a second summer circuit configured to subtract the postcursor correction value from the current FFE equalized data sample;
a multiplexer circuit connected to an output of each of the first and second summer circuits; and
first component decode circuit configured to determine a sign of the first symbol component of a previous FFE equalized data sample, and output a control signal that indicates the determined sign of the first symbol component of the previous FFE equalized data sample;
wherein the control signal output from the first component decode circuit controls the multiplexer circuit to select one of the outputs of the first and second summer circuit as the current DFE equalized data sample.

7. The clock recovery system of claim 1, wherein the DFFE circuit comprises:
a DFFE summer circuit configured to add the current DFE equalized data sample to each of a plurality of combinations of postcursor correction values and second symbol component values to generate a plurality of summed output values;
a DFFE multiplexer circuit connected to outputs of the DFFE summer circuit; and
a second component decode circuit configured to (i) determine a sign of the second symbol component of the current DFE equalized data sample, (ii) determine a sign of the second symbol component of a previous DFE equalized data sample, and (iii) output a control signal that indicates the determined signs of the second symbol components of the current and previous DFE equalized samples;
wherein the control signal output from the second component decode circuit controls the DFFE multiplexer circuit to select one of the summed output values as the current DFFE equalized data sample.

8. The clock recovery system of claim 1, further comprising control logic to precompute postcursor correction values based on the DFE tap value H1, which are utilized by the DFE and DFFE circuits.

9. The clock recovery system of claim 8, wherein the control logic is configured to process an operating mode control signal to configure an operating mode of the clock recovery system for one of 2-level line modulation and 4-level line modulation.

10. A digital receiver system, comprising:
an amplifier circuit configured to amplify a received analog signal, wherein the analog signal comprises a stream of data symbols, wherein each data symbol comprises a plurality of symbol components, including at least a first symbol component and a second symbol component;
an ADC (analog-to-digital converter) circuit configured to sample the analog signal in response to a sample clock signal and generate a digital signal comprising a sequence of digital data samples, wherein each digital data sample corresponds to one data symbol in the analog signal;
a digital equalization system configured to filter the digital signal to remove intersymbol interference and recover the stream of data symbols; and
a clock recovery system configured to process the digital signal and generate the sample clock signal which is applied to the ADC circuit, wherein the clock recovery system comprises:
a FFE (feed forward equalizer) circuit configured to remove precursor ISI (intersymbol interference) from the digital data samples and output FFE equalized data samples; and
a multi-stage postcursor ISI equalizer circuit configured to remove postcursor ISI from the FFE equalized data samples, the multi-stage postcursor ISI equalizer circuit comprising:
a first stage comprising a DFE (decision feedback equalizer) circuit configured to receive a current FFE equalized data sample, and remove a first component of postcursor ISI from the current FFE equalized data sample based on a DFE tap value H1 to generate a current DFE equalized data sample, wherein the first component of postcursor ISI which is removed from the current FFE equalized data sample comprises postcursor ISI which arises from a first symbol component of a previous digital data sample; and a second stage comprising a DFFE (decision feedforward equalizer) circuit configured to receive the current DFE equalized data sample, and remove a second component of postcursor ISI from the current FFE equalized data sample based on the same DFE tap value H1 to generate a current DFFE equalized data sample, wherein the second component of postcursor ISI which is removed from the current FFE equalized data sample comprises postcursor ISI which arises from a second symbol component of the previous digital data sample.

11. The digital receiver system of claim 10, wherein the DFFE circuit is further configured to remove all but one of the plurality of symbol components from each DFFE equalized data sample, and output an equalized 2-level digital signal comprising a sequence of equalized 2-level data samples.

12. The digital receiver system of claim 11, wherein the analog signal comprises a 4-level PAM (pulse amplitude modulation) signal, wherein each data symbol comprises a most-significant bit (MSB) as the first symbol component, and a least significant bit (LSB) as the second symbol component, and wherein the equalized 2-level digital signal output from the DFFE circuit comprises only the MSB components of the digital data samples.

13. The digital receiver system of claim 10, wherein the DFE circuit of the clock recovery system comprises:
 a first summer circuit configured to add a postcursor correction value to the current FFE equalized data sample;
 a second summer circuit configured to subtract the postcursor correction value from the current FFE equalized data sample;
 a multiplexer circuit connected to an output of each of the first and second summer circuits; and
 first component decode circuit configured to determine a sign of the first symbol component of a previous FFE equalized data sample, and output a control signal that indicates the determined sign of the first symbol component of the previous FFE equalized data sample;
 wherein the control signal output from the first component decode circuit controls the multiplexer circuit to select one of the outputs of the first and second summer circuit as the current DFE equalized data sample.

14. The digital receiver system of claim 10, wherein the DFFE circuit of the clock recovery system comprises:
 a DFFE summer circuit configured to add the current DFE equalized data sample to each of a plurality of combinations of postcursor correction values and second symbol component values to generate a plurality of summed output values;
 DFFE multiplexer circuit connected to outputs of the DFFE summer circuit; and
 a second component decode circuit configured to (i) determine a sign of the second symbol component of the current DFE equalized data sample, (ii) determine a sign of the second symbol component of a previous DFE equalized data sample, and (iii) output a control signal that indicates the determined signs of the second symbol components of the current and previous DFE equalized samples;
 wherein the control signal output from the second component decode circuit controls the DFFE multiplexer circuit to select one of the summed output values as the current DFFE equalized data sample.

15. The digital receiver system of claim 10, wherein the clock recovery system further comprises control logic to precompute postcursor correction values based on the DFE tap value H1, which are utilized by the DFE and DFFE circuits.

16. The digital receiver system of claim 15, wherein the control logic is configured to process an operating mode control signal to configure an operating mode of the clock recovery system for one of 2-level line modulation and 4-level line modulation.

17. A method, comprising:
 receiving an analog signal, wherein the analog signal comprises a stream of data symbols, wherein each data symbol comprises a plurality of symbol components, including at least a first symbol component and a second symbol component;
 converting the analog signal into a digital signal by sampling the analog signal using a sample clock signal to generate a sequence of digital data samples, wherein each digital data sample corresponds to one data symbol in the analog signal;
 equalizing the digital signal using a FFE (feed forward equalization) process to remove precursor ISI (intersymbol interference) from the digital data samples and generate FFE equalized data samples; and
 processing a current FFE equalized data sample using a multi-stage postcursor ISI equalizer circuit configured to remove postcursor ISI from the current FFE equalized data sample, wherein processing the current FFE equalized data sample comprises:
  equalizing the current FFE equalized data sample using a DFE (decision feedback equalization) process to remove a first component of postcursor ISI from the current FFE equalized data sample based on a DFE tap value H1 to generate a current DFE equalized data sample, wherein the first component of postcursor ISI which is removed from the current FFE equalized data sample comprises postcursor ISI which arises from a first symbol component of a previous digital data sample; and
  equalizing the current DFE equalized data sample using a DFFE (decision feedforward equalization) function to remove a second component of postcursor ISI from the current FFE equalized data sample based on the same DFE tap value H1 to generate a current DFFE equalized data sample, wherein the second component of postcursor ISI which is removed from the current FFE equalized data sample comprises postcursor ISI which arises from a second symbol component of the previous digital data sample.

18. The method of claim 17, further comprising removing all but one of the plurality of symbol components from each DFFE equalized data sample to generate an equalized 2-level digital signal comprising a sequence of equalized 2-level data samples.

19. The method of claim 18, wherein the analog signal comprises 4-level PAM (pulse amplitude modulation) signal, wherein each data symbol comprises a most-significant bit (MSB) as the first symbol component, and a least significant bit (LSB) as the second symbol component, and wherein the equalized 2-level digital signal comprises only the MSB components of the digital data samples.

20. The method of claim 17, wherein:
equalizing the current FFE equalized data sample using the DFE process comprises:
adding a postcursor correction value to the current FFE equalized data sample to generate a first sum value;
subtracting the postcursor correction value from the current FFE equalized data sample to generate a second sum value;
determining a sign of the first symbol component of a previous FFE equalized data sample;
generating a control signal that indicates the determined sign of the first symbol component of the previous FFE equalized data sample; and
utilizing the control signal to select one of the first and second sum values as the current DFE equalized data sample; and wherein equalizing the current DFE equalized data sample using the DFFE function comprises:
adding the current DFE equalized data sample to each of a plurality of combinations of postcursor correction values and second symbol component values to generate a plurality of summed output values;
determining a sign of the second symbol component of the current DFE equalized data sample;
determining a sign of the second symbol component of a previous DFE equalized data sample;
generating a control signal that indicates the determined signs of the second symbol components of the current and previous DFE equalized samples; and
utilizing the control signal to select one of the summed output values as the current DFFE equalized data sample.

* * * * *